United States Patent [19]

Rymut

[11] Patent Number: 5,043,700

[45] Date of Patent: Aug. 27, 1991

[54] MULTI-INPUT ELECTRICAL MONITOR

[75] Inventor: Michael J. Rymut, Cadillac, Mich.

[73] Assignee: Nartron Corporation, Reed City, Mich.

[21] Appl. No.: 526,182

[22] Filed: May 21, 1990

[51] Int. Cl.⁵ .......................................... G08B 23/00
[52] U.S. Cl. .................................. 340/517; 340/506; 340/513; 340/521
[58] Field of Search ............... 340/517, 521, 520, 522, 340/506, 508, 513

[56] References Cited

U.S. PATENT DOCUMENTS 3,289,193 11/1966 Worthington et al. ............. 340/517
3,950,745 4/1976 Miller .
3,978,478 8/1976 Schmitz ............................... 340/506
4,204,201 5/1980 Williams et al. ..................... 340/517
4,536,747 8/1985 Jensen ................................. 340/521

Primary Examiner—Donnie L. Crosland
Attorney, Agent, or Firm—Lon H. Romanski

[57] ABSTRACT

A multi-input electrical monitor has a plurality of input terminals for connection to a plurality of condition responsive transducers whereby the input terminals receive electrically both high and low signals when the transducers respond to respective preselected conditions; a signal generator responds to the existance of such conditions when particular combinations of such electrically high and/or low signals are received by the input terminals.

29 Claims, 4 Drawing Sheets 5,043,700

MULTI-INPUT ELECTRICAL MONITOR

FIELD OF THE INVENTION

This invention relates generally to electrical circuit monitoring means and more particularly to such monitoring means wherein multiple parameters or conditions are to be monitored.

BACKGROUND OF THE INVENTION

Heretofore, especially in automobile and truck applications, it had become desirable to sense various operating parameters as well as other vehicular conditions reflective of, for example, vehicle and/or passenger safety.

In an attempt to satisfy such attendant sensing requirements, the prior art has, heretofore, provided a plurality of sensing devices for respectively sensing a plurality of operating parameters and then supplied a like plurality of warning devices respectively actuatable directly in response to the operation of respective ones of said plurality of sensing devices. This prior art approach has proven to be extremely costly and not totally reliable. Usually, such prior art systems are tailored as to have, for example, a particular sensor and cooperating warning device employable for only one particular application and, therefore, this, in turn, requires the greatly added expense of providing different tooling and testing equipment for the manufacturing of each such sensor and warning device combination as well as the added expense of installing each such combination within the vehicle. Further, in those situations wherein the prior art has attempted to provide a single electrical monitoring assembly having multiple inputs, such were not effectively capable of operatively receiving both electrically LOW and electrically HIGH input signals wherein either one or a combination of which might be employed to indicate the existance of a preselected condition or a particular parameter.

Accordingly, the invention as herein disclosed and described is primarily concerned with the solution of the foregoing as well as other related and attendant problems of the prior art.

SUMMARY OF THE INVENTION

According to one aspect of the invention, a multi-input electrical monitor comprises a plurality of input terminal means effective for connection to a plurality of associated condition sensing means, second terminal means for in circuit connection to an associated source of electrical potential, wherein at least a certain of said plurality of input terminal means receives a first input signal from a certain of said associated condition sensing means, wherein said first input signal is either electrically HIGH or electrically LOW depending upon whether a first monitored condition is sensed by said certain of said associated condition sensing means as being in either a first or second state, wherein at least an other of said plurality of input terminal means receives a second input signal from an other of said associated condition sensing means, wherein said second input signal is either electrically HIGH or electrically LOW depending upon whether a second monitored condition is sensed by said other of said associated condition sensing means as being in either a third or fourth state, output signal generating means, and electrical logic circuitry means electrically interconnecting said certain of said plurality of input terminal means and said other of said plurality of input terminal means to said output signal generating means whereby said output signal generating means is caused to produce an output signal whenever said first input signal is produced in response to said first state being sensed.

Various objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENTS

Figure 1:
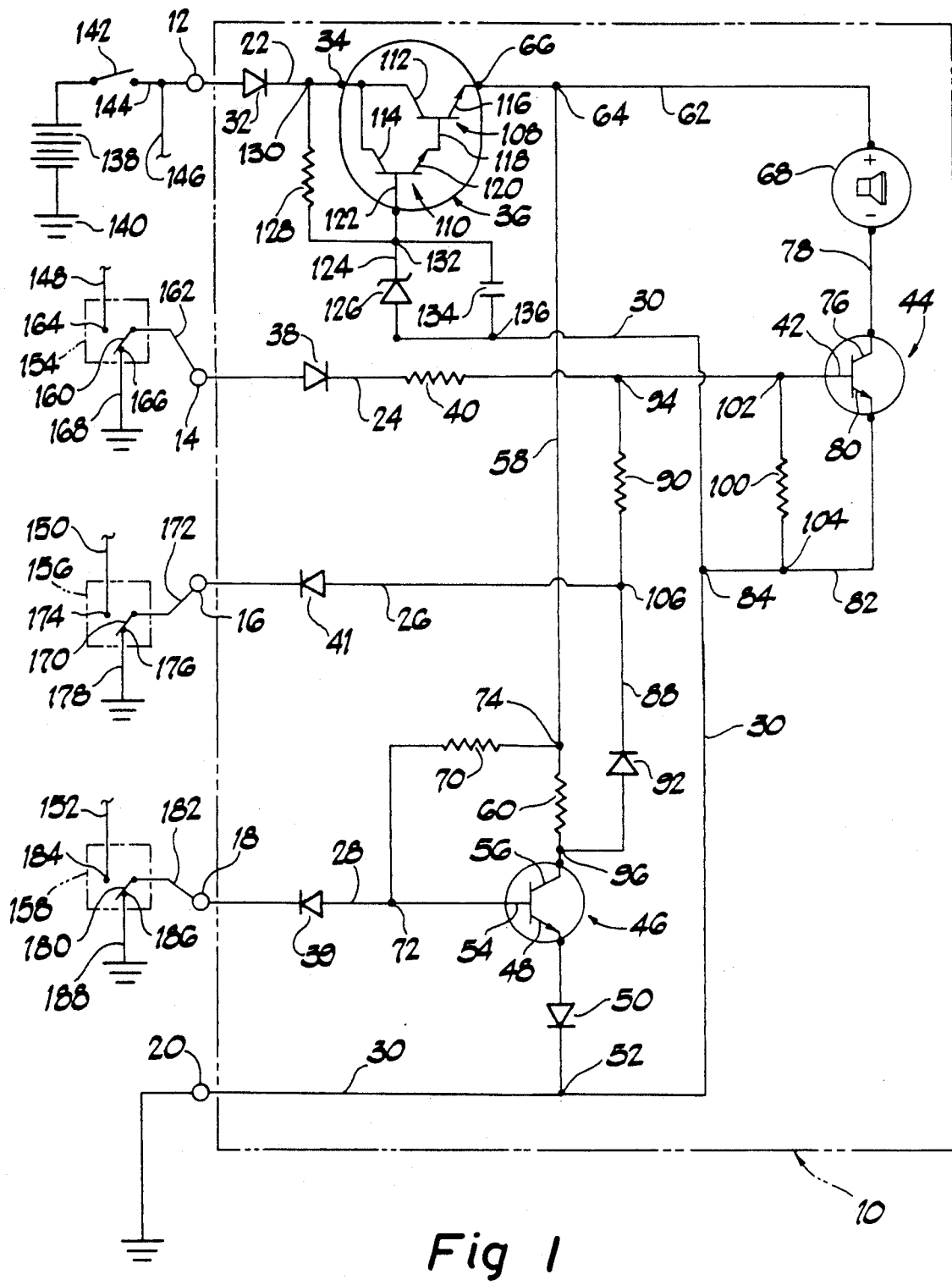
FIG. 1 is a schematic wiring diagram illustrating a multi-input electrical monitor employing teachings of the invention.

Referring now in greater detail to the drawings, in FIG. 1, the electrical warning means and system 10 is illustrated as comprising a plurality of terminal or contact means 12, 14, 16, 18, and 20 which, in turn, are depicted as being respectively connected to conductor means 22, 24, 26, 28 and 30.

Conductor means 22, comprising a diode 32, is connected to the collector terminal 34 of a Darlington transistor 36 while conductor means 24, comprising diode means 38 and resistor means 40, is connected to the base terminal 42 of an NPN transistor 44.

An NPN transistor 46 has its emitter 48 electrically connected, through diode means 50, to conductor means 30 as at point 52. The base 54 of transistor 46 is connected to conductor means 28 which also comprises diode means 39. The collector 56 of transistor 46 is connected through conductor means 58 and series resistor means 60 to a conductor 62, as at a point 64 thereof, which is connected to the emitter terminal 66 of Darlington transistor 36. The other electrical end of conductor means 62 is connected to one electrical side of suitable output signal generating means 68. A resistance means 70 has its opposite ends electrically connected to conductor means 28 and 58, as at points 72 and 74, with such point 74 being, generally, electrically between the resistor 60 and emitter 66.

The NPN transistor 44 has its collector 76 electrically connected, as via conductor means 78, to the other electrical side of signal generating means 68 while its emitter 80 is electrically connected, as via conductor means 82, to conductor emeans 30 as at a point 84 thereof. A conductor means 88, comprising series situated resistor means 90 and diode means 92, is electrically connected to conductor means 24, as at a point 94 thereof, and to conductor means 58 as at a point 96 generally electrically between resistor means 60 and collector 56 of transistor 46. A resistance means 100 has its opposite ends electrically connected to conductor means 24 and 82, as at points 102 and 104 thereof, wherein such point 102 is electrically between base 42 and resistors 40 and 90 while point 104 is electrically between emitter 80 and ground terminal 20.

Conductor means 26, comprising diode means 41, is, electrically connected to conductor means 88 as at point 106, which is generally electrically between diode 92 and resistance means 90.

As is generally well known, the Darlington transistor or circuit 36 is comprised of transistors 108 and 110 with their respective collectors 112 and 114 electrically connected to the collector terminal 34 and the emitter 116 of transistor 108 being electrically connected to the emitter terminal 66. The base 118 of transistor 108 is electrically connected to the emitter 120 of transistor 110 while the base 122 of transistor 110 is electrically connected, as via conductor means 124, to one electrical side of a zener diode 126 which has its other electrical side connected to conductor means 30.

A resistor 128 has its opposite electrical ends connected to conductor means 22, as at a point 130 generally electrically between diode 32 and collector terminal 34, and to conductor means 124 as at a point 132 generally electrically between base 122 and zener diode 126. A capacitor means 134 is also situated as to have one electrical side thereof connected to conductor means 124, as at a point 132, and as to have its other electrical side connected to conductor means 30 as at a point 136 thereof.

A suitable source of electrical potential 138, grounded 142 and conductor means 144, to contact or terminal means 12. Additional conductor means 146 may be electrically connected to conductor means 144 and, in turn, electrically connected to each of conductor means 148, 150 and 152 of associated transducer means somewhat diagrammatically illustrated at 154, 156 and 158.

Transducer means 154 may be considered as comprising switch means 160, electrically connected via conductor means 162 to contact or terminal means 14, and electrical contact means 164 and 166 respectively connected to conductor means 148 and to conductor means 168, which leads to ground potential.

Transducer means 156 may be considered as comprising switch means 170, electrically connected via conductor means 172 to contact or terminal means 16, and electrical contact means 174 and 176 respectively connected to conductor means 150 and to conductor means 178, which leads to ground potential.

Transducer means 158 may be considered as comprising switch means 180, electrically connected via conductor means 182 to contact or terminal means 18, and electrical contact means 184 and 186 respectively connected to conductor means 152 and to conductor means 188, which leads to ground potential.

In the embodiment of FIG. 1, the various components may have values and/or be identified as to their types and sources as follows:

| Resistor 128: | 10K | |
|---|---|---|
| Resistor 70: | 15K | |
| Resistor 60: | 4.7K | |
| Resistor 90: | 2.0K | |
| Resistor 100: | 20K | |
| Capacitor 134: | 0.01μ | 50.0 V. |

Each of the diodes 32, 38, 41, 39, 50 and 92, could be type IN4004; zener diode 126 could be type IN5245; Darlington transistor 36 could be type MPSA13 obtainable from Motorola Semiconductor Products, Inc. of Phoenix, AZ.; transistors 44 and 46 could each be type 2N4124 obtainable from said generating means 68 may be an audio transducer commercially available, as item or model TMB-12, from OEM Division, of Star Micronics Corp., of 70-D Ethel Road West, Piscataway, N.J.

In FIG. 1, the respective transducer means 154, 156 and 158 are responsive to any selected condition of operating parameter desired to be sensed and monitored. Depending upon the then status of the sensed or monitored conditions or parameters: switch means 160 may be closed against either contact 164 or 166; switch means 170 may be closed against either contact 174 or 176; and switch means 180 may be closed against either contact 184 or 186. Further, it should be made clear that even though the depicted transducer means 154, 156 and 158 illustrate mechanical-type switching means, the actual switching functions thereof could be performed by any suitable means including, but not limited to, solid-state electrical devices. Also, it should be made clear that the invention may operate in a manner whereby any of switch means 160, 170 and 180 are caused to be positioned in an electrically open position, and not as against either of the respective two associated electrical contacts, in response to a particular sensed or monitored condition or parameter.

If the assembly and system 10 were employed in combination with, for example, an automotive vehicle as an automobile, truck, bus or the like, such transducer means 154, 156 and 158 could be responsive to such conditions as, for example: (a) engine oil pressure; (b) engine oil level; (c) engine coolant temperature; (d) radiator coolant level; (e) battery line charge voltage from (generator) alternator; (f) battery voltage; (g) transmission overdrive lock-out; (h) vehicular parking brake failure; (i) vehicular door being open or closed; and, especially with regard to buses and/or trucks (j) magnitude of air pressure in air tanks; (k) correctness of air line attachment from the tractor to its trailer; (l) correctness of attachment of electrical harness from the tractor to its trailer; and (m) oil pump pressure. It should be clear that the invention is not so limited and may be employed in many other environments and applications among which could be industrial applications wherein transducer means could be employed for responding to the presence or absence of operating parameters or even in the modification or change in operating parameters. Also, the invention 10 may be employed in combination with other operating electrical circuitry with the inputs at 14, 16, and 18 being referenced to selected points of such operating electrical circuitry as to respond to such monitored selected points.

OPERATION OF THE INVENTION

For purposes of description, let it be assumed that the invention as disclosed in FIG. 1 is employed in combination with a (tractor-trailer) truck and that the source of electrical potential 138 could be: (1) the truck battery; or (2) the truck (generator) alternator; or (3) even the truck battery and alternator combined in their function as being a source of electrical potential, and that the transducers 154, 156 and 158 are operatively carried by the truck as to be responsive to selected operating conditions and/or parameters. Also, for purposes of description, let it be assumed that switch 142 comprises the vehicular engine ignition switch assembly which, in turn, as is well known, may also complete electrical circuits to various engine and/or vehicular accessories.

In the embodiment of FIG. 1, and for purposes of description, let it be further assumed:

(A) Transducer means 154 is responsive to a first monitored condition or parameter and in response thereto causes switch means 160 to close against contact 166 when the status of the monitored condition or parameter is in a first preselected status and, when the status of the monitored condition or parameter is in a second preselected status, causes switch means 160 to close against contact 164. When switch means 160 is closed against contact 164 an assumed voltage of +15.0 volts (hereinafter referred to as HIGH) may be applied to terminal or contact means 14 and when switch means 160 is closed against contact 166, electrical ground potential (hereinafter referred to as LOW) will be applied to terminal or contact means 14.

(B) Transducer means 156 is responsive to a second monitored condition or parameter and in response thereto causes switch means 170 to close against contact 176 when the status of such second monitored condition or parameter is in a first preselected status and, when the status of such second monitored condition or parameter is in a second preselected status, causes switch means 170 to close against contact 174. When switch means 170 is closed against contact 174 an assumed voltage of +15.0 volts (hereinafter referred to as HIGH) may be applied to terminal or contact means 16 and when switch means 170 is closed against contact 176, electrical ground potential (hereinafter referred to as LOW) will be applied to terminal or contact means 16.

(C) Transducer means 158 is responsive to a third monitored condition or parameter and in response thereto causes switch means 180 to close against contact 184 when the status of such third monitored condition or parameter is in a first preselected status and, when the status of such third monitored condition or parameter is in a second preselected status, causes switch means 180 to close against contact 186. When switch means 180 is closed against contact 184 an assumed voltage of +15.0 volts (hereinafter referred to as HIGH) may be applied to terminal or contact means 18 and when switch means 180 is closed against contact 186, electrical ground potential (hereinafter referred to as LOW) will be applied to terminal or contact means 18.

Still referring to FIG. 1, let it now be assumed that the switch 142 has been closed and that the vehicular engine is operating.

Diode 32 is provided in order to block current flow in the event that the power inputs to the system 10 are accidentally reversed.

The Darlington transistor 36, in conjunction with zener diode 126, functions as a series voltage regulator. The voltage supplied by the source 138, in the assumed automotive vehicle, may be in the order of 13.5 volts and since zener diode 126 is a 15.0 volt diode, current will not usually flow in zener diode 126. However, current will flow through resistance 128 and into base 122 of transistor 36 and such current flow through base 122 will turn transistor 36 "on".

If the ignition or supply voltage were to exceed 15.0 volts, then zener diode 126 would divert current from base 122 to ground, as via conductor means 30, so that the base voltage relative to ground could never exceed 15.0 volts.

Such an increase in ignition or supply voltage could occur if, for example, one were to place a 24.0 volt battery in parallel with the nominal 12.0 volt battery of the vehicle (sometimes referred to as "jumping"), or if a load dump occurred; i.e., the vehicular battery became disconnected while under load causing the generator to produce a high voltage pulse of significant duration.

Capacitor 134 serves as a filter for voltage spikes as may appear at base 122.

It is believed that the operation of the monitoring and alarm means 10 of FIG. 1 can best be understood by describing such during respective differing inputs.

CONDITION—I

In this condition it is assumed that switch means 160, 170 and 180 are respectively closed against contacts 166, 176 and 186 thereby applying a LOW signal to each of input contacts or terminals 14, 16 and 18. Consequently, current will flow from terminal 66 of transistor 36 to point 64 and from there along conductor means 58 to point 74 from where the current flows through resistance means 60 and resistance means 70. Since terminal means 18 is effectively at LOW, the current flowing through resistance means 70 flows along conductor means 28, through diode 39, conductor means 182, switch means 180 and through conductor 188 to indicated LOW or ground potential. Such current flow prevents sufficient current flow to base 54 of transistor 46 thereby resulting in transistor 46 being (non-conductive) "off".

The current which flows through resistance means 60 continues and as at point 96 flows along conductor means 88 and diode 92 to point 106 from where the current flows along conductor means 26, through diode 41, conductor means 172, switch means 170 and through conductor 178 to indicated LOW or ground potential. Any current which may flow from point 106 through resistance means 90 to point 94 and then to base 42 of transistor 44 is of such a small magnitude as to be insufficient to cause transistor 44 to be (conductive) turned "on" and therefore transistor 44 remains "off".

As a consequence of transistor 44 being "off" no current flow is experienced from point 64 through conductor means 62 and alarm or sensory warning means 68.

The above described operation for the assumed "Condition—I" can be illustrated by the following table wherein a LOW input is designated by an "0" (zero) and a HIGH input is designated by a "1" (one), and, wherein when transistor 44 is "off" such is designated by a "0" (zero) while when transistor 44 is "on" such is designated by a "1" (one).

| INPUT TERMINALS | | | TRANSISTOR |
|---|---|---|---|
| 14 | 16 | 18 | 44 |
| 0 | 0 | 0 | 0 |

CONDITION—II

In this condition it is assumed that: (a) switch means 160 is closed against contact 166 thereby applying a LOW signal to input contact or terminal means 14; (b) switch means 170 is closed against contact 176 thereby applying a LOW signal to input or terminal means 16; and (c) that switch means 180 is closed against contact 184 thereby applying a HIGH signal to input or terminal means 18. Consequently, current will flow from terminal 66 of transistor 36 to point 64 and from there along conductor means 58 to point 74 from where the current flows through resistance means 60 and 70. Since terminal 18 is at HIGH, the current through resistance means 70 cannot flow from point 72 to terminal 18 and instead flows into base 54 of transistor 46 with such being sufficient to turn transistor 46 "on". Consequently, the current flowing through resistance means 60 flows through the collector-emitter of transistor 46 and through diode 50 to ground potential via conductor means 30. Any current which may flow from point 96 and through conductor 26 is of a very small magnitude, and, any current which may flow from point 106 through resistance means 90 to base 42 of transistor 44 is of a still smaller magnitude and insufficient to turn transistor 44 "on".

As a consequence of transistor 44 being "off" no current flow is experienced from point 64 through conductor The above described operation for the assumed "Condition-II" can be illustrated by the following table wherein the "0" and "1" designations are as defined with regard to the previous table.

| INPUT TERMINALS | | | TRANSISTOR |
|---|---|---|---|
| 14 | 16 | 18 | 44 |
| 0 | 0 | 1 | 0 |

CONDITION—III

In this condition it is assumed that: (a) switch means 160 is closed against contact 166 thereby applying a LOW signal to input contact or terminal means 14; (b) switch means 170 is closed against contact 174 thereby applying a HIGH signal to input contact or terminal means 16; and (c) switch means 180 is closed against contact 186 thereby applying a LOW signal to input contact or terminal means 18. Consequently, current will flow from terminal 66 of transistor 36 to point 64 and from there along conductor means 58 to point 74 from where the current flows through resistance means 70 and 60. Since terminal means 18 is effectively at LOW, the current flowing through resistance means 70 flows along conductor means 28, through diode 39, conductor means 182, switch means 180 and through conductor 188 to indicated LOW or ground potential. Such current flow prevents base 54 of transistor 46 from receiving sufficient current to turn transistor 46 "on" and, therefore, transistor 46 remains "off".

The current that flows through resistance means 60, not being able to flow through the turned "off" transistor 46, flows along conductor means 88, through diode 92 and resistance means 90, to point 94 and then along conductor means 24 to base 42 of transistor 44 causing transistor 44 to turn "on". (The because of diode 38. Also, current as at point 106 cannot flow along conductor means 26 to terminal means 16 because of terminal means 16 being HIGH.) With transistor 44 being "on", current as at point 64 also flows through conductor means 62, sensory signal generating means 68 causing energization thereof and, via conductor means 78, through the collector-emitter of transistor 44.

The above described operation for the assumed "Condition-III" can be illustrated by the following table wherein the "0" and "1" designations are as defined with respect to the previous tables.

| INPUT TERMINALS | | | TRANSISTOR |
|---|---|---|---|
| 14 | 16 | 18 | 44 |
| 0 | 1 | 0 | 1 |

CONDITION—IV

In this condition it is assumed that: (a) switch means 160 is closed against contact 166 thereby applying a LOW signal to input contact or terminal means 14; (b) switch means 170 is closed against contact 174 thereby applying a HIGH signal to input contact or terminal means 16; and (c) that switch means 180 is closed against contact 184 thereby applying a HIGH signal to input contact or terminal means 18. Consequently, current will flow from terminal 66 of transistor 36 to point 64 and from there along conductor 58 to point 74 from where the current flows through resistance means 70 and 60. Since terminal 18 is at HIGH, the current through resistance means 70 cannot flow from point 72 to terminal 18 and instead flows into base 54 of transistor 46 with such being sufficient to turn transistor 46 "on". Therefore, the current flowing through resistance means 60 flows through the collector-emitter of transistor 46 and through diode 50 to ground potential via conductor means 30. Any current which may flow from point 96 through conductor means 88 and into base 42 of transistor 44 is of a very small magnitude and insufficient to turn transistor 44 "on". Consequently, with transistor 44 remaining "off" no current flows from point 64 through signal generating means 68 and such signal means 68 remains de-energized.

The above described operation for the assumed "Condition-IV" can be illustrated by the following table wherein the "0" and "1" designations are as defined with respect to the previous tables.

| INPUT TERMINALS | | | TRANSISTOR |
|---|---|---|---|
| 14 | 16 | 18 | 44 |
| 0 | 1 | 1 | 0 |

CONDITION—V

In this condition it is assumed that: (a) switch means 160 is closed against contact 164 thereby applying a HIGH signal to input contact or terminal means 14; (b) switch means 170 is closed against contact 176 thereby applying a LOW signal to input contact or terminal means 16; and (c) that switch means 180 is closed against contact 186 thereby applying a LOW signal to input contact or terminal means 18. Consequently, current will flow from terminal 66 of transistor 36 to point 64 and from there along conductor means 58 to point 74 from where the current flows through resistance means 70 and 60. Since terminal means 18 is effectively at LOW, the current flowing through resistance means 70 flows along conductor means 28, through diode 39, conductor means 182, switch means 180 and through conductor 188 to indicated LOW or ground potential. Such current flow prevents sufficient current flow to base 54 of transistor 46 thereby resulting in transistor 46 being "off".

The current which flows through resistance means 60 continues into conductor means 88, passing through diode 92, flowing to point 106 and then through conductor means 26 through diode 41 to indicated LOW or ground potential as via switch 170 and conductors 172, 178.

Current also flows from input terminal means 14 through conductor means 24, and diode 38 and resistance 40 therein, to base 42 of transistor 44 causing transistor 44 to be turned "on". (A small portion of the current in conductor means 24 may flow from point 94 through resistance means 90 to point 106 and then through conductor means 26 through diode 41 to indicated LOW or ground potential as via conductors 172 and 178 and switch 170.) With transistor 44 being "on" current as at point 64 also flows through conductor means 62, sensory signal generating means 68 causing energization thereof and, via conductor means 78, through the collector-emitter of transistor 44.

The above described operation of the assumed "Condition-V" can be illustrated by the following table wherein the "0" and "1" designations are as defined with respect to the previous tables.

| INPUT TERMINALS | | | TRANSISTOR |
| --- | --- | --- | --- |
| 14 | 16 | 18 | 44 |
| 1 | 0 | 0 | 1 |

CONDITION—VI

In this condition it is assumed that: (a) switch means 160 is closed against contact 164 thereby applying a HIGH signal to input contact or terminal means 14; (b) switch means 170 is closed against contact 176 thereby applying a LOW signal to input contact or terminal means 16; and (c) that switch means 180 is closed against contact 184 thereby applying a HIGH signal to input contact or terminal means 18. Consequently, current will flow from terminal 66 of transistor 36 to point 64 and from there along conductor 58 to point 74 from where the current flows through resistance means 70 and 60. Since terminal means 18 is at HIGH, the current through resistance means 70 cannot flow from point 72 to terminal 18 and instead flows into base 54 of transistor 46 with such being sufficient to turn transistor 46 "on". Therefore, the current flowing through resistance means 60 flows through the collector-emitter of transistor 46 and through diode 50 to ground potential via conductor means 30.

Current also flows from input terminal means 14 through conductor means 24, and diode 38 and resistance 40 therein, to base 42 of transistor 44 causing transistor 44 to be turned "on". (A small portion of the current in conductor means 24 may flow from point 94 through resistance means 90 to point 106 and then through conductor means 26 through diode 41 to indicated LOW or ground potential as via conductors 172 and 178 and switch 170.) With transistor 44 being "on" current as at point 64 also flows through conductor means 62, sensory signal generating means 68 causing energization thereof and, via conductor means 78, through the collector-emitter of transistor 44.

The above described operation of the assumed "Condition—VI" can be illustrated by the following table wherein the "0" and "1" designations are as defined with respect to the previous tables.

| INPUT TERMINALS | | | TRANSISTOR |
| --- | --- | --- | --- |
| 14 | 16 | 18 | 44 |
| 1 | 0 | 1 | 1 |

CONDITION—VII

In this condition it is assumed that: (a) switch means 160 is closed against contact 164 thereby applying a HIGH signal to input or terminal means 14; (b) switch means 170 is closed against contact 174 thereby applying a HIGH signal to input or terminal means 16; and (c) that switch means 180 is closed against contact 186 thereby applying a LOW signal to input contact or terminal means 18. Consequently, current will flow from terminal 66 of transistor 36 to point 64 and from there along conductor means 58 to point 74 from where the current flows through resistance means 70 and 60. Since terminal means 18 is effectively at LOW, the current flowing through resistance means 70 flows along conductor means 28, through diode 39, conductor means 182, switch means 180 and through conductor 188 to indicated LOW or ground potential. Such current flow prevents sufficient current flow to base 54 of transistor 46 thereby resulting in transistor 46 being "off".

Current also flows from input terminal means 14 through conductor means 24, and diode 38 and resistance 40 therein, to base 42 of transistor 44 causing transistor 44 to be turned "on". Also, the current which flows through resistance means 60 continues into and through conductor means 88 (not being able to flow from point 106 through conductor 26 because terminal 16 is at HIGH) to point 94 and, in effect joining the current from input 14, flows to the base 42 of transistor 44. With transistor 44 being "on" current as at point 64 also flows through conductor means 62, sensory signal generating means 68 causing energization thereof and, via conductor means 78, through the collector-emitter of transistor 44.

The above described operation of assumed "Condition VII" can be illustrated by the following table wherein the "0" and "1" designations are as defined with respect to the previous tables.

| INPUT TERMINALS | | | TRANSISTOR |
| --- | --- | --- | --- |
| 14 | 16 | 18 | 44 |
| 1 | 1 | 0 | 1 |

CONDITION—VIII

In this condition it is assumed that switch means 160, 170 and 180 are respectively closed against contacts 164, 174 and 184 thereby applying a HIGH signal to each of input contacts or terminals 14, 16 and 18. Consequently, current will flow from terminal 66 of transistor 36 to point 64 and from there along conductor means 58 to point 74 from where the current flows through resistance means 60 and 70. Since terminal 18 is at HIGH, the current through resistance means 70 cannot flow from point 72 to terminal 18 and instead flows into base 54 of transistor 46 with such being sufficient to turn transistor 46 "on". Consequently, the current flowing through resistance means 60 flows through the collector-emitter of transistor 46 and through diode 50 to ground potential via conductor means 30.

Current also flows from input terminal means 14 through conductor means 24, and diode 38 and resistance 40 therein, to base 42 of transistor 44 causing transistor 44 to be turned "on". With transistor 44 being "on" current as at point 64 also flows through conductor means 62, sensory signal generating means 68 causing energization thereof and, via conductor means 78, through the collector-emitter of transistor 44.

The above described operation of the assumed "Condition—VIII" can be illustrated by the following table wherein the "0" and "1" designations are as defined with respect to the previous tables:

| INPUT TERMINALS | | | TRANSISTOR |
|---|---|---|---|
| 14 | 16 | 18 | 44 |
| 1 | 1 | 1 | 1 |

The foregoing tables for the respective assumed "Conditions" may be combined to form an over-all truth table as follows.

| | TRUTH TABLE | | | |
|---|---|---|---|---|
| ASSUMED | INPUT TERMINALS | | | TRANSISTOR |
| CONDITIONS | 14 | 16 | 18 | 44 |
| I | 0 | 0 | 0 | 0 |
| II | 0 | 0 | 1 | 0 |
| III | 0 | 1 | 0 | 1 |
| IV | 0 | 1 | 1 | 0 |
| V | 1 | 0 | 0 | 1 |
| VI | 1 | 0 | 1 | 1 |
| VII | 1 | 1 | 0 | 1 |
| VIII | 1 | 1 | 1 | 1 |

Still with regard to the embodiment of FIG. 1, let it be assumed that transducer 154 is responsive to engine oil pressure, that transducer 156 is responsive to radiator coolant temperature and that transducer 158 is responsive to the fluid level in the engine coolant radiator.

Transducer 154 will respond with a voltage signal along conductor 162 to input 14, if the engine oil pressure drops below a selected minimum allowable safe operating pressure. The voltage signal at input 14 may range from 0.0 volts to 15.0 volts. Conductor 148 supplies a battery voltage or a combination of battery and alternator voltage to transducer 154 and a HIGH logic level of "1" will be representative of an input voltage signal from transducer 154 ranging from 1.2 volts to 15.0 volts. A HIGH input voltage signal from transducer 154 indicates that the engine oil pressure has decreased in magnitude to an unsafe engine operating condition. A LOW logic level of "0" will be representative of an input voltage signal from transducer 154 ranging from 0.0 volts to less than 1.2 volts. A LOW input voltage signal from transducer 154, which is equivalent to electrical ground 168, indicates that the engine oil pressure is in a safe, normal or desired range of operation.

Transducer 156, responsive to radiator coolant operating temperature, will respond with a voltage signal along conductor 172 to input 16, if the radiator coolant temperature exceeds a normal operating temperature. The voltage signal at input 16 can range from 0.0 volts to 15.0 volts. Conductor 150 supplies a battery voltage or a combination of battery and alternator voltage to transducer 156. A HIGH logic level of "1" will be representative of an input voltage signal from transducer 156, ranging from 0.6 volts to 15.0 volts. A HIGH input voltage signal from transducer 156 indicates that the radiator coolant temperature is above normal operating range and at least approaching unsafe operating conditions. A LOW logic level of "0" will be representative of an input voltage signal from transducer 156 ranging from 0.0 volts to less than 0.6 volts. A LOW input voltage signal from transducer 156, which is equivalent to electrical ground 178, indicates that the radiator coolant temperature is in a safe, normal or desired range of operation.

Transducer 158 is responsive to the radiator fluid level in the radiator. During normal engine operation, the radiator fluid level will maintain a minimum and maximum level of equilibrium in the radiator. Transducer 158 will apply a voltage signal along conductor 182 to input 18 indicative of the condition of the radiator fluid level. The voltage signal at input 18 can range from 0.0 volts to 15.0 volts. Conductor 152 supplies a battery voltage or a combination of battery and alternator voltage to transducer 158. A LOW logic level "0" will be representative of an input voltage signal from transducer 158, ranging from 0.0 volts to less than 0.6 volts. A LOW input voltage signal from transducer 158, which is equivalent to electrical ground 188, indicates that the radiator fluid level in the radiator is below the acceptable normal range of operation. A HIGH logic level "1" will be representative of an input voltage signal from transducer 158, ranging from 0.6 volts to 15.0 volts. A HIGH input voltage signal from transducer 158 indicates that the radiator fluid level in the radiator is at a normal or desired range of operation.

In view of the foregoing, it can be seen that each of transducers 154, 156 and 158, will supply either a HIGH or a LOW input voltage signal to input terminal means 14, 16 and 18, respectively During normal or desired operation of the truck engine, or components of the vehicle, the following output voltage signals will be supplied by transducers 154, 156 and (a) the output voltage signal at or from transducer 158 will be at a HIGH logic level;
(b) the output voltage signal at or from transducer 154 will be at a LOW logic level; and
(c) the output voltage signal at or from transducer 156 will be at a LOW logic level.

Further, during operating conditions in which damage may occur or may about to occur to the truck engine, and/or components of the vehicle, the following output voltage signals will be supplied by transducers 154, 156 and 158:

(d) the output voltage signal at or from transducer 154 will be at a HIGH logic level;
(e) the output voltage signal at or from transducer 156 will be at a HIGH logic level; and
(f) the output voltage signal at or from transducer 158 will be at a LOW logic level.

In view of the foregoing, it can be seen that there are eight different possible combinations of input signals that may be present at input terminals or means 14, 16 and 18 with such being generally set forth in previously discussed "Condition-I" through "Condition—VIII". As should now be apparent, with an undesired, unsafe or damaging operating condition present, transistor 44 will become switched or turned "on" causing alarm means 68 to be activated for the following combinations of transducer output signals:

(1) transducer 156 output signal being a HIGH logic level while each of transducers 154 and 158 having output signals which are a LOW logic level, or, (2) transducer 154 output signal being a HIGH logic level while each of transducers 156 and 158 having output signals which are a LOW logic level, or, has an output signal having a LOW logic level, or, (3) transducer 154 and 158 each having output signals which have a HIGH logic level while transducer 156 has an output signal having a LOW logic level, or, (4) transducers 154 and 156 each having output signals which have a HIGH logic level while transducer 158 has an output signal having a LOW logic level, or, (5) transducers 154, 156 and 158 each having output signals of a HIGH logic level.

With normal or desired operating conditions present, transistor will not be "on", thereby resulting in alarm means 68 being inactive for the following transducer output signal combinations:

(6) transducers 154, 156 and 158 each having output signals of a LOW logic level, or, (7) transducer 158 output signal being a HIGH logic level while each of transducers 154 and 156 having output signals which are a LOW logic level, or, (8) transducers 156 and 158 each having output signals which have a HIGH logic level while transducer 154 has an output signal having a LOW logic level.

The foregoing eight combinations of transducer output signals, and the consequent operation of the embodiment of the invention in FIG. 1, may be summarized as follows. Transistor 44 will be switched "on" causing alarm means 68 to be activated when transducer 154 output signal (applied to input terminal means 14) has a HIGH logic level accounting for four of the possible five transducer input signal combinations in which a failure mode has occurred. Output signals from transducers 156, and 158 (and respectively applied to input terminal means 16 and 18) have no effect on transistor 44 switching status when transducer 154 output signal (on input means 14) has a HIGH logic level. When the output signal of transducer 154 has a LOW logic level, there is one possible transducer output signal combination in which a failure mode exists; that is, transducer 156 must be producing an output signal having a HIGH logic level and transducer 158 must be producing an output signal having a LOW logic level for a failure mode to be indicated. The remaining three input signal combinations, hereinbefore identified at (6), (7) and (8), are to be considered normal or desired operational conditions of the assumed truck engine or components of the vehicle. The output signal produced by transducer 154 and applied to input terminal means 14 is independent and has highest priority over transducers 156 and 158 output signal combinations. Transducers 156 and 158 output signal combinations are dependent upon each other to obtain the desired output in which a failure has occurred causing transistor 44 to be switched "on" activating alarm means 68.

Figure 2:
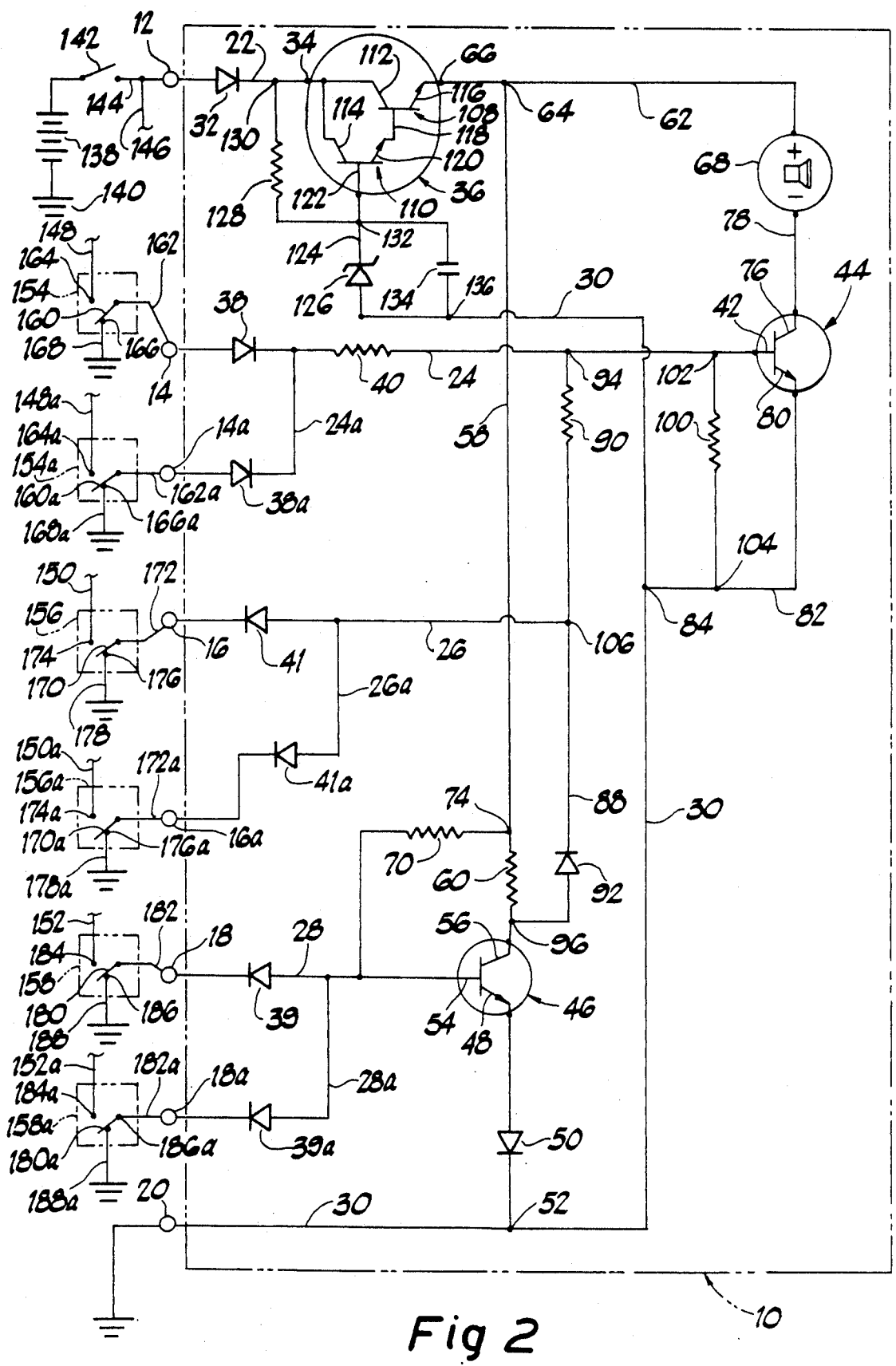
FIG. 2 is a schematic wiring diagram illustrating another embodiment employing teachings of the invention.

FIG. 2 illustrates a form of the invention which, in effect, is identical to that of FIG. 1 with the exception that additional transducer means and input contact or terminal means are provided. In FIG. 2 all elements which are the same as those of FIG. 1 are identified with like reference numbers; those elements which are, in effect, added are identified with reference numbers provided with a suffix "a".

More particularly, it can readily be seen that: input contact or terminal means 14a, 16a and 18a have been added; diode means 38a, 41a and 39a have been added; conductor means 24a, 26a and 28a have been added; and that transducer means 154a, 156a and 158a have been added.

Conductor means 24a serves to electrically connect terminal 14a and diode 38a to conductor means 24 as at a point thereof between diode 38 and resistance means 40. Input terminal means 14a is electrically connected to related transducer means 154a as by conductor means 162a.

Conductor means 26a serves to electrically connect terminal means 16a and diode 41a to conductor means 26 as at a point thereof between diode 41 and point 106. Input terminal means 16a is electrically connected to related transducer means 156a as by conductor means 172a.

Conductor means 28a serves to electrically connect terminal means 18a and diode 39a to conductor means 28 as at a point thereof between diode 39 and base 54. Input terminal means 18a is electrically connected to related transducer means 158a as by conductor means 182a.

For simplicity of disclosure, it may be assumed that in transducer means 154a, 156a and 158a those elements which are like or similar to those of transducer means 154, 156 and 158, respectively, are identified with like reference numbers provided with a suffix "a".

Further, as is evident, diode 38a is in parallel with diode 38; diode 41a is in parallel with diode 41 and diode 39a is in parallel with diode 39. It should also be now apparent that: any number of input terminals and diodes (as depicted by 14a, 38a and 24a) could be added as to be in parallel with input terminal means 14 and diode 38; any number of input terminals and diodes (as depicted by 16a, 41a and 26a) could be added as to be in parallel with input terminal means 16 and diode 41; and any number of input terminals and diodes (as depicted by 18a, 39a and 28a) could be added as to be in parallel with input terminal means 18 and diode 39.

In view of the overall Truth Table previously presented herein, it can be seen that: (a) if any of the multiple input contacts or terminals 14 and 14a are at HIGH, transistor 44 will be "on" and signal generating means 68 will be energized; and (b) if all of the multiple input contacts or terminals 14 and 14a are at LOW, then the only way transistor 44 can be turned "on" is to simultaneously have all input contacts or terminals 16 and 16a at HIGH and at least one of the multiple input contacts or terminals 8 and 18a at LOW.

Still referring to FIG. 2, let it again be assumed, for purposes of disclosure, that the embodiment of the invention of FIG. 2 is employed in combination with a truck (tractor-trailer) application and that transducers 154, 154a, 156, 156a, 158 and 158a are selectively located throughout the truck and responding to selected operating conditions and/or parameters. Activation of switch means 142, which comprises the vehicular engine ignition switch means, completes the electrical connections to various engine and/or vehicular accessories.

Transducer 154 is responsive to the vehicle driver's door. During normal operation, the driver's door should remain closed and, if the driver's door is open while the engine ignition is active, transducer 154 will respond with a voltage signal along conductor 162 to input means 14. The voltage signal at input means 14 can range from 0.0 volts to 15.0 volts. Conductor 148 supplies a battery voltage, or a combination of battery and alternator voltage, to transducer 154. A HIGH logic level of "1" will be representative of an input voltage, from transducer 154 and applied to input means 14, ranging from 1.2 volts to 15.0 volts. A HIGH input voltage signal from transducer 154 indicates that the vehicle driver's door is open resulting in an unsafe vehicle operating condition. A LOW logic level of "0" will be representative of an input voltage signal from transducer 154 and applied to input means 14, ranging from 0.0 volts to less than 1.2 volts. A LOW input voltage signal from transducer 154, which is equivalent to electrical ground 168, indicates the vehicle driver's door is closed, and such represents a normal or desired mode of vehicular operation.

Transducer 154a is responsive to the vehicle passenger's door. During normal operation, such door should remain closed. If the passenger door is open, while the ignition is active, transducer 154a will respond with a voltage signal along conductor 162a to input means 14a. The voltage signal at input means 14a can range from 0.0 volts to 15.0 volts. Conductor 148a supplies a battery voltage, or a combination of battery and alternator voltage, to transducer 154a. A HIGH logic level of "1" will be representative of an input voltage signal, from transducer 154a and applied to input means 14a, ranging from 1.2 to 15.0 volts. A HIGH input voltage signal from transducer 154a indicates that the passenger's door is open, resulting in an unsafe vehicle operating condition. A LOW logic level of "0" will be representative of an input voltage signal, from transducer 154a and applied to input means 14a, ranging from 0.0 volts to less than 1.2 volts. A LOW input voltage signal from transducer 154a, which is equivalent to electrical ground 168a, indicates that the passenger's door is closed, and such represents a safe, normal or desired mode of vehicular operation.

Transducer 156 is responsive to (vehicular) truck engine operating state. That is, if the engine is running (operating), transducer 156 will respond with a voltage signal along conductor 172 to input means 16. The voltage signal applied to input means 16 can range from 0.0 volts to 15.0 volts. Conductor 150 supplies a battery voltage, or a combination of battery and alternator voltage, to transducer 156. A HIGH logic level of "1" will be representative of an input voltage signal, from transducer 156 and applied to input means 16, ranging from 0.6 volts to 15.0 volts. A HIGH input voltage signal, from transducer 156 and applied to input means 16, indicates that the vehicular engine is running. A LOW logic level of "0" will be representative of an input voltage signal, from transducer 156 and applied to input means 16, ranging from 0.0 volts to less than 0.6 volts. Such a LOW input voltage signal from transducer 156, which is equivalent to electrical ground 178, indicates the engine is not operating.

Transducer 156a is responsive to the vehicle driver's use and non-use of a safety-belt. Transducer 156a will respond with a voltage signal along conductor 172a to input means 16a, if the driver's safety belt is not operationally latched. The voltage signal at input means 16a can range from 0.0 volts to 15.0 volts. Conductor 150a supplies a battery voltage, or a combination of battery and alternator voltage, to transducer 156a. A HIGH logic level of "1" will be representative of an input voltage signal, from transducer 156a and applied to input means 16a, ranging from 0.6 volts to 15.0 volts. A HIGH input voltage signal from transducer 156a indicates that the driver's safety belt is not operationally latched. A LOW logic level of "0" will be representative of an input voltage signal, from transducer 156a and applied to input means 16a, ranging from 0.0 volts to less than 0.6 volts. Such a LOW input voltage signal from transducer 156a, which is equivalent to electrical ground 178a, indicates that the driver's safety belt is operationally latched and such represents a normal or desired mode of vehicular operation.

Transducer 158 is responsive to use of the vehicular hand brake. Transducer 158 will respond with a voltage signal along conductor 182 to input means 18, if the vehicular hand brake is not actuated. The voltage signal at input means 18 can range from 0.0 volts to 15.0 volts. Conductor 152 supplies a battery voltage, or a combination of battery and alternator voltage, to transducer 158. A LOW logic level "0" will be representative of an input voltage signal, from transducer 158 and applied to input means 18, ranging from 0.0 volts to less than 0.6 volts. A LOW input voltage signal, from transducer 158, is equivalent to electrical ground 188, and the LOW input voltage signal indicates the hand brake is not actuated. A HIGH logic level "1" will be representative of an input voltage signal, from transducer 158 and applied to input means 18, ranging from 0.6 volts to 15.0 volts. Such a HIGH input voltage signal, from transducer 158, indicates the vehicular hand brake is actuated or applied.

Transducer 158a is responsive to the vehicular parking brake. Transducer 158a will respond with a voltage signal along conductor 182a to input means 18a, if the vehicular park brake is not actuated or applied. The voltage signal at input means 18a can range from 0.0 volts to 15 volts. Conductor 152a supplies a battery voltage, or a combination of battery and alternator voltage, to transducer 158a. A LOW logic level "0" will be representative of an input voltage signal, from transducer 158a and applied to input means 18a, ranging from 0.0 volts to less than 0.6 volts. A LOW input voltage signal from transducer 158 is equivalent to electrical ground 188a and such LOW input voltage signal indicates the park brake is not actuated or applied. A HIGH logic level "1" will be representative of an input voltage signal, from transducer 158a and applied to input means 18a, ranging from 0.6 volts to 15.0 volts and such a HIGH input voltage signal from transducer 158a indicates that the park brake is actuated or applied.

Each of transducers 154, 154a, 156, 156a, 158 and 158a, will supply either a HIGH or a LOW input voltage signal to input means 14, 14a, 16, 16a, 18 and 18a, respectively. During monitored normal or desired operation of the truck engine or components of the vehicle, the following output voltage signals will be respectively present at transducers 154, 154a, 156, 156a, 158 and 158a and applied to input means 14, 14a, 16, 16a, 18 and 18a:

(a) the output voltage signals at transducers 158 and 158a, and applied to input means 18 and 18a, will be at a HIGH logic level; and (b) the output voltage signals at transducers 154, 154a, 156 and 156a, and applied to input means 14, 14a, 16 and 16a, will be at a LOW logic level.

During operating conditions wherein vehicular driver safety may be violated, the following output voltage signals will be present at transducers 154, 154a, 156, 156a, 158 and 158a and applied to input means 14, 14a, 16, 16a, 18 and 18a:

(c) the output voltage signals at transducers 154, 154a, 156 and 156a and applied to input means 14, 14a, 16 and 16a, will be at a HIGH logic level; and (d) the output voltage signals at transducers 158 and 158a, and applied to input means 18 and 18a, will be at a LOW logic level.

In the embodiment of FIG. 2, there are six input terminal means 14, 14a, 16, 16a, 18 and 18a each of which will receive either a HIGH or a LOW logic level input voltage signal and there are sixty-four possible combinations of input signals that will be present at input means 14, 14a, 16, 16a, 18 and 18a.

Further, in the embodiment of FIG. 2, there are fifty-one possible transducer applied input signal combinations which indicate a normal or desired monitored operation has failed on the vehicle and that the vehicular operator should be warned of the failure mode. Transistor 44 will be switched "on" causing alarm or output signal means 68 to be activated for the following transducer input combinations wherein:

1. transducers 156 and 156a have output signals which are a transducers 154, 154a, 158 and 158a have output signals which are a LOW logic level; or
2. transducers 156, 156a, and 158a have output signals which are a HIGH logic level while transducers 154, 154a and 158 have output signals which are a LOW logic level; or
3. transducers 156, 156a and 158 have output signals which are a HIGH logic level while transducers 154, 154a and 158a have output signals which are a LOW logic level; or
4. transducer 154a has an output signal which is a HIGH logic level while transducers 154, 156, 156a, 158 and 158a have output signals which are a LOW logic level; or
5. transducers 154a and 158a have output signals which are a HIGH logic level while transducers 154, 156, 156a and 158 have output signals which are a LOW logic level; or
6. transducers 154a and 158 have output signals which are a HIGH logic level while transducers 154, 156, 156a and 158a have output signals which are a LOW logic level; or
7. transducers 154a, 158 and 158a have output signals which are a HIGH logic level while transducers 154, 156 and 156a have output signals which are a LOW logic level; or
8. transducers 154a and 156a have output signals which are a HIGH logic level while transducers 154, 156, 158 and 158a have output signals which are a LOW logic level; or
9. transducers 154a, 156a and 158a have output signals which are a HIGH logic level while transducers 154, 156 and 158 have output signals which are a LOW logic level; or
10. transducers 154a, 156a and 158 have output signals which are a HIGH logic level while transducers 154, 156 and 158a have output signals which are a LOW logic level; or
11. transducers 154a, 156a, 158 and 158a have output signals which are a HIGH logic level while transducers 154 and 156 have output signals which are a LOW logic level; or
12. transducers 154a and 156 have output signals which are a HIGH logic level while transducers 154, 156a, 158 and 158a have output signals which are a LOW logic level; or
13. transducers 154a, 156 and 158a have output signals which are a HIGH logic level while transducers 154, 156a and 158 have output signals which are a LOW logic level; or
14. transducers 154a, 156 and 158 have output signals which are a HIGH logic level while transducers 154, 156a and 158a have output signals which are a LOW logic level; or
15. transducers 154a, 156, 158 and 158a have output signals which are a HIGH logic level while transducers 154 and 156a have output signals which are a LOW logic level; or
16. transducers 154a, 156 and 156a have output signals which are a HIGH logic level while transducers 154, 158, and 158a have output signals which are a LOW logic level; or
17. transducers 154a, 156, 156a and 158a have output signals which are a HIGH logic level while transducers 154 and 158 have output signals which are a LOW logic level; or
18. transducers 154a, 156, 156a and 158 have output signals which are a HIGH logic level while transducers 154 and 158a have output signals which are a LOW logic level; or
19. transducers 154a, 156, 156a, 158 and 158a have output signals which are a HIGH logic level while transducer 154 has an output signal which is a LOW logic level; or
20. transducer 154 has an output signal which is a HIGH logic level while transducers 154a, 156, 156a, 158 and 158a have output signals which are a LOW logic level; or
21. transducers 154 and 158a have output signals which are a HIGH logic level while transducers 154a, 156, 156a and 158 have output signals which are a LOW logic level; or
22. transducers 154 and 158 have output signals which are a HIGH logic level while transducers 154a, 156, 156a and 158a have output signals which are a LOW logic level; or
23. transducers 154, 158 and 158a have output signals which are a HIGH logic level while transducers 154a, 156 and 156a have output signals which are a LOW logic level; or
24. transducers 154 and 156a have output signals which are a HIGH logic level while transducers 154a, 156, 158 and 158a have output signals which are a LOW logic level; or
25. transducers 154, 156a and 158a have output signals which are a HIGH logic level while transducers 154a, 156 and 158 have output signals which are a LOW logic level; or
26. transducers 154, 156a and 158 have output signals which are a HIGH logic level while transducers 154a, 156 and 158a have output signals which are a LOW logic level; or
27. transducers 154, 156a, 158 and 158a have output signals which are a HIGH logic level while transducers 154a and 156 have output signals which are a LOW logic level; or
28. transducers 154 and 156 have output signals which are a HIGH logic level while transducers 154a, 156a, 158 and 158a have output signals which are a LOW logic level; or
29. transducers 154, 156 and 158a have output signals which are a HIGH logic level while transducers 154a, 156a and 158 have output signals which are a LOW logic level; or
30. transducers 154, 156 and 158 have output signals which are a HIGH logic level while transducers 154a, 156a and 158a have output signals which are a LOW logic level; or 31. transducers 154, 156, 158 and 158a have output signals which are a HIGH logic level while transducers 154a and 156a have output signals which are a LOW logic level; or
32. transducers 154, 156 and 156a have output signals which are a HIGH logic level while transducers 154a, 158 and 158a have output signals which are a LOW logic level; or
33. transducers 154, 156, 156a and 158a have output signals which are a HIGH logic level while transducers 154a and 158 have output signals which are a LOW logic level; or
34. transducers 154, 156, 156a and 158 have output signals which are a HIGH logic level while transducers 154a and 158a have output signals which are a LOW logic level; or
35. transducers 154, 156, 156a, 158 and 158a have output signals which are a HIGH logic level while transducer 154a has an output signal which is at a LOW logic level; or
36. transducers 154 and 154a have output signals which are a HIGH logic level while transducers 156, 156a, 158 and 158a have output signals which are a LOW logic level; or
37. transducers 154, 154a and 158a have output signals which are a HIGH logic level while transducers 156, 156a and 158 have output signals which are a LOW logic level; or
38. transducers 154, 154a and 158 have output signals which are a HIGH logic level while transducers 156, 156a and 158a have output signals which are a LOW logic level; or
39. transducers 154, 154a, 158 and 158a have output signals which are a HIGH logic level while transducers 156 and 156a have output signals which are a LOW logic level; or
40. transducers 154, 154a and 156a have output signals which are a HIGH logic level while transducers 156, 158 and 158a have output signals which are a LOW logic level; or
41. transducers 154, 154a, 156a and 158a have output signals which are a HIGH logic level while transducers 156 and 158 have output signals which are a LOW logic level; or
42. transducers 154, 154a, 156a and 158 have output signals which are a HIGH logic level while transducers 156 and 158a have output signals which are a LOW logic level; or
43. transducers 154, 154a, 156a, 158 and 158a have output signals which are a HIGH logic level while transducer 156 has an output signal which is a LOW logic level; or
44. transducers 154, 154a and 156 have output signals which are a HIGH logic level while transducers 156a, 158 and 158a have output signals which are a LOW logic level; or
45. transducers 154, 154a, 156 and 158a have output signals which are a HIGH logic level while transducers 156a and 158 have output signals which are a LOW logic level; or
46. transducers 154, 154a, 156 and 158 have output signals which are a HIGH logic level while transducers 156a and 158a have output signals which are a LOW logic level; or
47. transducers 154, 154a, 156, 158 and 158a have output signals which are a HIGH logic level while transducer 156a has an output signal which is a LOW logic level; or
48. transducers 154, 154a, 156 and 156a have output signals which are a HIGH logic level while transducers 158 and 158a have output signals which are a LOW logic level; or
49. transducers 154, 154a, 156, 156a and 158a have output signals which are a HIGH logic level while transducer 158 has an output signal which is a LOW logic level; or
50. transducers 154, 154a, 156, 156a and 158 have output signals which aare a HIGH logic level while transducer 158a has an output signal which is a LOW logic level; or
51. transducers 154, 154a, 156, 156a, 158 and 158a have output signals which are a HIGH logic level In addition to the foregoing, in the embodiment of FIG. 2, there are thirteen possible combinations of input signals, produced as at transducers 154, 154a, 156, 156a, 158 and 158a and respectively applied to input means 14, 14a, 16, 16a, 18 and 18a, which would indicate normal or acceptable operating conditions for those which are being monitored. In each of such thirteen conditions, as follow, transistor means will be "off" thereby causing output means 68 to be in a de-energized or inactive state:

1. transducers 154, 154a, 156, 156a, 158 and 158a have output signals which are a LOW logic level; or
2. transducer 158a has an output signal which is a HIGH logic level while transducers 154, 154a, 156, 156a and 158 have output signals which are a LOW logic level; or
3. transducer 158 has an output signal which is a HIGH logic level while transducers 154, 154a, 156, 156a and 158a have output signals which are a LOW logic level; or
4. transducers 158a and 158 have output signals which are a HIGH logic level while transducers 154a, 156 and 156a have output signals which are a LOW logic level; or
5. transducer 156a has an output signal which is a HIGH logic level while transducers 154, 154a, 154a56, 158 and 158a have output signals which are a LOW logic level; or
6. transducers 156a and 158a have output signals which are a HIGH logic level while transducers 154, 154a, 156 and 158 have output signals which are a LOW logic level; or
7. transducers 156a and 158 have output signals which are a HIGH logic level while transducers 154, 154a, 156 and 158a have output signals which are a LOW logic level; or
8. transducers 156a, 158 and 158a have output signals which are a HIGH logic level while transducers 154, 154a and 156 have output signals which are a LOW logic level; or
9. transducer 156 has an output signal which has a HIGH logic level while transducers 154, 154a, 156a, 158 and 158a have output signals which are a LOW logic level; or
10. transducers 156 and 158a have output signals which are a HIGH logic level while transducers 154, 154a, 156a and 158 have output signals which are a LOW logic level; or
11. transducers 156 and 158 have output signals which are a HIGH logic level while transducers 154, 154a, 156a and 158a have output signals which are a LOW logic level; or
12. transducers 156 158 and 158a have output signals which are a HIGH logic level while transducers 154,

154a and 156a have output signals which are a LOW logic level; or 13. transducers 156, 156a, 158 and 158a have output signals which are a HIGH logic level while transducers 154 and 154a have output signals which are a LOW logic level.

In view of the foregoing, it should now be apparent that the invention provides, among other things, logic circuitry means wherein certain input means are of the highest priority in exercising control. That is when input means 14 is in this case, HIGH, output means 68 will be energized regardless of the magnitude (HIGH or LOW) of the signal impressed or applied to any of the other input means. Also, specifically with reference to FIG. 2, when a HIGH signal is applied: (a) to input means 14; or (b) to input means 14a; or (c) to both input means 14 and 14a, the magnitudes (HIGH or LOW) of the signals then existing on the remaining input means has no effect on the then operating state of transistor 44. Therefore, input means 14 and/or input means 14a may be considered as being of the highest priority.

As should now be evident, in the embodiment of FIG. 2, there are only three combinations of input signals which applied to input means 16, 16a, 18 and 18a will result in the energization of signal generating or output means 68 when the applied signals to each of input means 14 and 14a is LOW. The first of such three combinations would be wherein a HIGH signal is applied to both input means 16 and 16a while input means 18 and 18a each have a LOW signal applied thereto. The second of such three combinations would be wherein a HIGH signal is applied to both input means 16 and 16a while input means 18 has a HIGH signal applied thereto and input means 18a has a LOW signal applied thereto. The third of such three combinations would be wherein a HIGH signal is applied to both input means 16 and 16a while input means 18 has a LOW signal applied thereto and input means 18a has a HIGH signal applied thereto.

FIGS. 3, 4, 5, 6 and 7 illustrate modifications of the invention as disclosed in either FIG. 1 or 2. In each of FIGS. 3, 4, 5, 6 and 7 only so much of the circuitry of FIGS. 1 or 2 is shown as is necessary to understand the the modification depicted and described. Further, all elements in FIGS. 3, 4, 5, 6 and 7 which are like or similar to those of FIGS. 1 or 2 are identified with like reference numbers.

Figure 3:
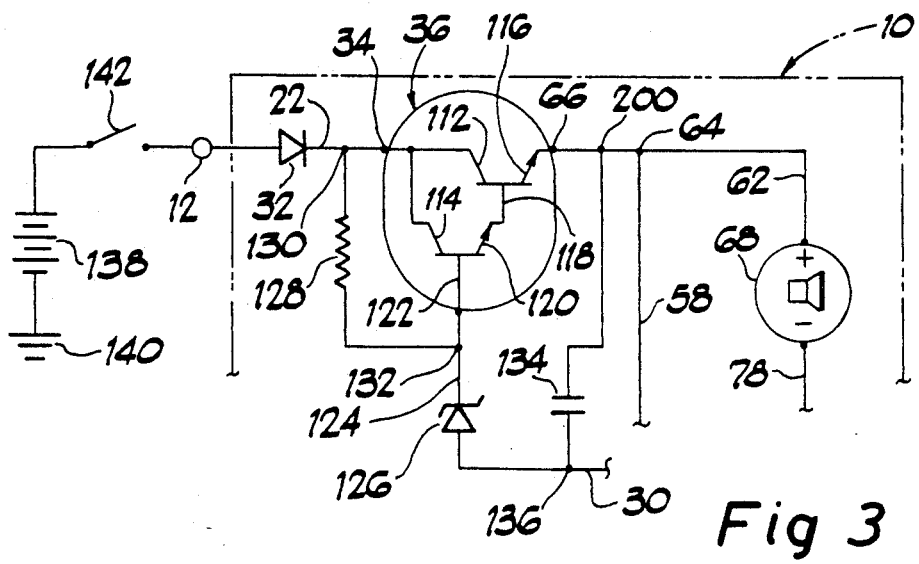
FIGS. 3, 4, 5, 6 and 7 are each fragmentary portions of the circuitry of either FIGS. 1 or 2 and respectively illustrating modifications of the electrical monitors of FIGS. 1 and 2.

By comparing FIGS. 1 or 2 and 3, it can be seen that the modification contemplated in FIG. 3 resides in the manner or electrical placement of capacitor means 134. That is, even though one electrical side of capacitor means 134 is still brought to electrical ground, as at 136 in the manner shown in either FIGS. 1 or 2, the other electrical side of capacitor 134, in FIG. 3, is brought electrically to the emitter 116 of transistor 36 as depicted by point 200 of conductor means 62. By placing the capacitor means 134, as depicted in FIG. 3, the response time of the transistor 36, responding to any voltage spikes as at input terminal means 12, will be shortened.

Figure 4:
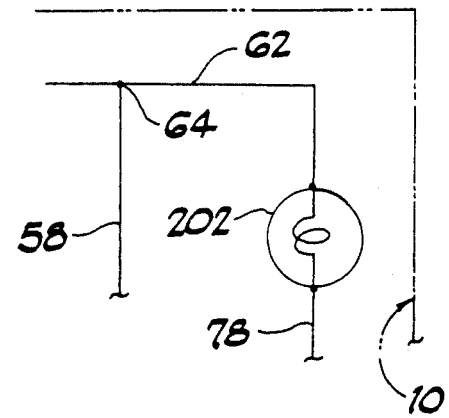

FIG. 4 illustrates that the sensory signal generating means may, in fact, be suitable lamp or light generating means 202 and that such may be substituted for the output signal generating means 68 of FIGS. 1, 2 or 3.

Figure 5:
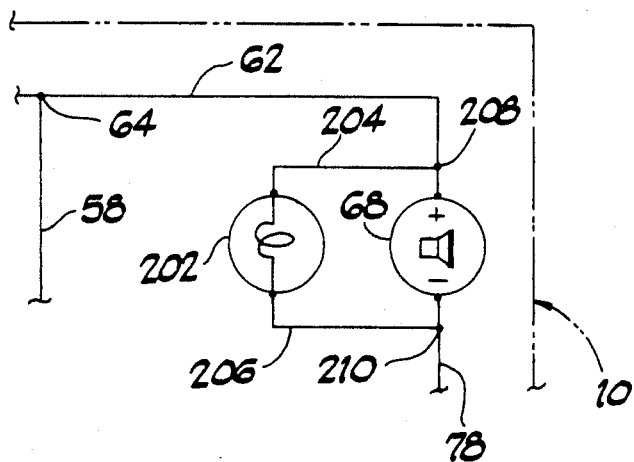

FIG. 5 illustrates that the apparatus 10 may be modified as to comprise the output signal generating means 68, of FIGS. 1, 2 or 3, and the output signal generating means 202 of FIG. 4 with such, preferably, being in parallel to each other as by having the light generating means 202 electrically connected, as via conductor means 204, to conductor means 62 as at a point 208 thereof and, as via conductor means 206, to conductor means 78 as at a point 210 thereof.

Figure 6:
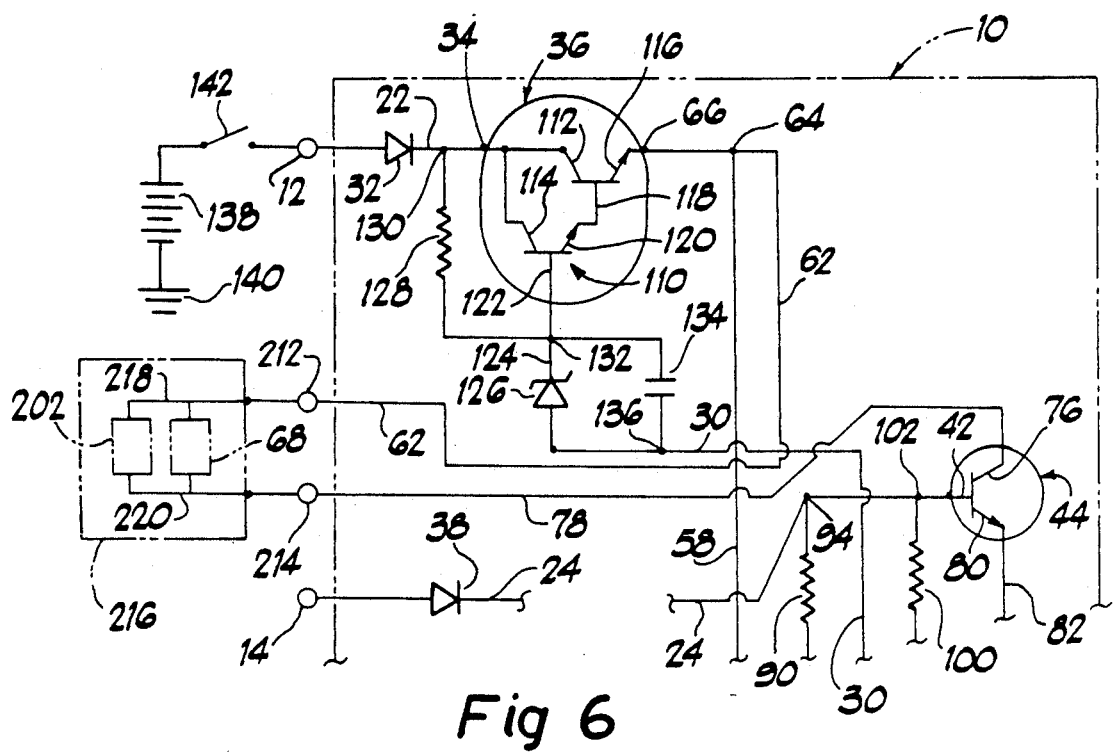

The modification of FIG. 6 contemplates having the apparatus 10 provided with additional terminal means 212 and 214 respectively electrically connected to conductor means 62 and 78. The output signal generating means 216 may be effectively separated from the remainder of apparatus 10 and, for example, fixedly mounted as on the instrument panel of the associated automotive (or other) vehicle or as on the instrument or control panel means of other associated apparatus, industrial or otherwise, the related parameters of which are being monitored. For simplicity of illustration, the output signal generating means 216 is depicted, diagrammatically, as comprising the signal generating means 68 (of FIGS. 1, 2, 3 and 5) and the signal generating means 202 (of FIGS. 4 and 5) electrically coupled to each other and to input terminal means 212 and 214 as by parallel conductor means 218 and 220.

Figure 7:
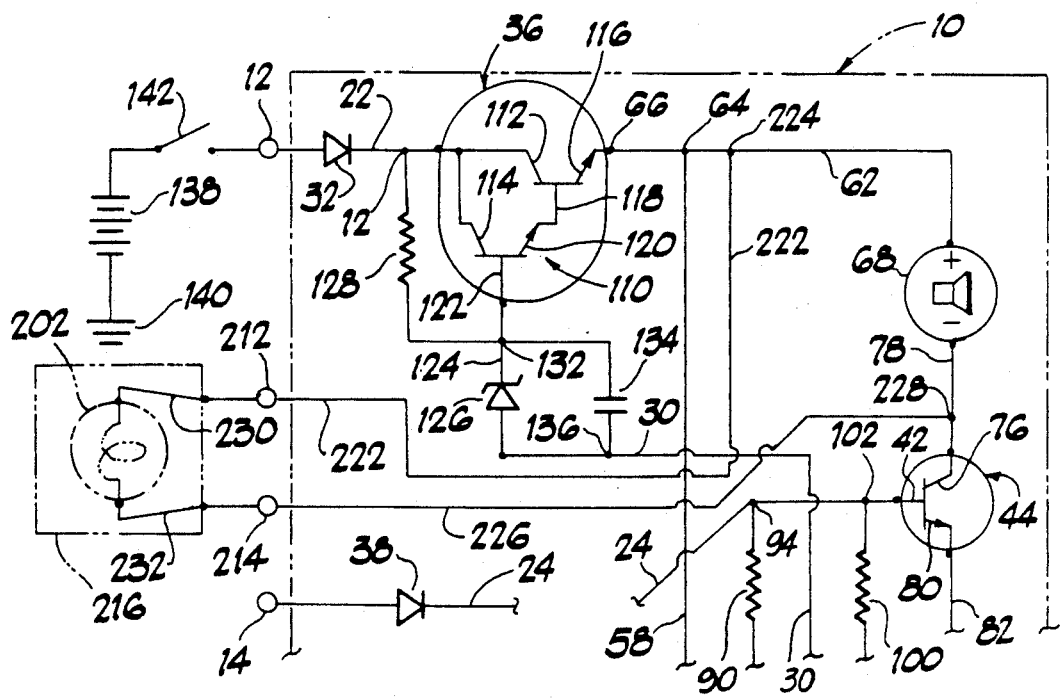

FIG. 7 is in the main similar to the embodiments of FIGS. 1 2 or 3 and FIG. 6. That is, one of the output signal generating means 68 is depicted as being within assembly or apparatus 10, in the manner disclosed in FIGS. 1, 2 or 3, while a second output signal generating means 216 is depicted as being remotely situated with respect to assembly 10 as may occur by having the signal generating means 216 fixedly mounted on other apparatus as herein set forth and discussed with reference to FIG. 6. In the embodiment of FIG. 7, the additional input contact means 212 is electrically connected to conductor means 62, as at a point 224 thereof, as via conductor means 222 while additional input contact means 214 is electrically connected, as via conductor means 226, to conductor means 78 as at a point 228 thereof. In the embodiment of FIG. 7, the output auditory signal generating means 68 is depicted as being within the assembly 10 while the remotely situated output signal generating means 216 is illustrated as comprising the lamp or visual output signal generating means 202 electrically connected to terminals 212 and 214 as by conductors 230 and 232, respectively. Of course, in FIG. 7, the auditory output signal generating means 68 could be replaced by a amp assembly or visual output signal generating means functionally equivalent to means 202 and, likewise, the visual output signal generating means 202 could be replaced by an auditory signal generating means functionally equivalent to means 68 thereby having either two spaced (one within the assembly 10 and the other remotely situated) visual signal generating means or two spaced auditory signal generating means.

In the preferred embodiment, the various elements, shown contained within the encompassing phantom line identified by reference number 10, would be operatively carried by a printed circuit board as would the input terminal means; further the various conductors depicted in any of the Figures, as also generally within said phantom line identified by reference number 10, would preferably be formed by functionally equivalent printed circuits carried by such printed circuit board Although only a preferred embodiment and a limited number of modifications thereof have been disclosed and described, it is apparent that other embodiments and modifications of the invention are possible within the scope of the appended claims.

What is claimed is:

1. A multi-input electrical monitor, comprising a plurality of input terminal means effective for connection to a plurality of associated condition sensing means, second terminal means for in circuit connection to an associated source of electrical potential, wherein at least a certain of said plurality of input terminal means receives a first input signal from a certain of said associated condition sensing means, wherein said first input signal is either electrically HIGH or electrically LOW depending upon whether a first monitored condition is sensed by said certain of said associated condition sensing means as being in either a first or second state, wherein at least an other of said plurality of input terminal means receives a second input signal from an other of said associated condition sensing means, wherein said second input signal is either electrically HIGH or electrically LOW depending upon whether a second monitored condition is sensed by said other of said associated condition sensing means as being in either a third or fourth state, output signal generating means, and electrical logic circuitry means electrically interconnecting said certain of said plurality of input terminal means and said other of said plurality of input terminal means to said output signal generating means whereby said output signal generating means is caused to produce an output signal whenever said first input signal is produced in response to said first state being sensed.

2. A multi-input electrical monitor according to claim 1 wherein said first input signal is electrically HIGH when said first monitored condition is sensed as being in said first state.

3. A multi-input electrical monitor according to claim 1 wherein said other of said plurality of input terminal means comprises at least first second third and fourth input terminals, wherein said second input signal is applied to said first input terminal, wherein said second input terminal receives a third input signal from a third of said associated condition sensing means, wherein said third input signal is either electrically HIGH or electrically LOW depending upon whether a third monitored condition is sensed by said third of said associated condition sensing means as being in either a fifth or sixth state, wherein said third input terminal receives a fourth input signal from a fourth of said associated condition sensing means wherein said fourth input signal is either electrically HIGH or electrically LOW depending upon whether a fourth monitored condition is sensed by said fourth of said associated condition sensing means as being in either a seventh or eighth state, wherein said fourth input terminal receives a fifth input signal from a fifth of said associated condition sensing means, wherein said fifth input signal is either electrically HIGH or electrically LOW depending upon whether a fifth monitored condition is sensed by said fifth of said associated condition sensing means as being in either a ninth or tenth state, and wherein when said output signal is produced in response to said first state being sensed said output signal continues to be produced regardless of the respective states sensed by all of said associated condition sensing means.

4. A multi-input electrical monitor according to claim 1 wherein said other of said plurality of input terminal means comprises at least first second third and fourth input terminals, wherein said second input signal is applied to said first input terminal, wherein said second input terminal receives a third input signal from a third of said associated condition sensing means, wherein said third input signal is either electrically HIGH or electrically LOW depending upon whether a third monitored condition is sensed by said third of said associated condition sensing means as being in either a fifth or sixth state, wherein said third input terminal receives a fourth input signal from a fourth of said associated condition sensing means, wherein said fourth input signal is either electrically HIGH or electrically LOW depending upon whether a fourth monitored condition is sensed by said fourth of said associated condition sensing means as being in either a seventh or eighth state, wherein said fourth input terminal receives a fifth input signal from a fifth of said associated condition sensing means, wherein said fifth input signal is either electrically HIGH or electrically LOW depending upon whether a fifth monitored condition is sensed by said fifth of said associated condition sensing means as being in either a ninth or tenth state, wherein when said output signal is produced in response to said first state being sensed said output signal continues to be produced regardless of the respective states sensed by all of said associated condition sensing means, and wherein when said first state ceases to be sensed and instead said second state is sensed said output signal generating means ceases to produce said output signal.

5. A multi-input electrical monitor according to claim 1 wherein said other of said plurality of input terminal means comprises at least first second third and fourth input terminals, wherein said second input signal is applied to said first input terminal, wherein said second input terminal receives a third input signal from a third of said associated condition sensing means, wherein said third input signal is either electrically HIGH or electrically LOW depending upon whether a third monitored condition is sensed by said third of said associated condition sensing means as being in either a fifth or sixth state, wherein said third input terminal receives a fourth input signal from a fourth of said associated condition sensing means, wherein said fourth input signal is either electrically HIGH or electrically LOW depending upon whether a fourth monitored condition is sensed by said fourth of said associated condition sensing means as being in either a seventh or eighth state, wherein said fourth input terminal receives a fifth input signal from a fifth of said associated condition sensing means, wherein said fifth input signal is either electrically HIGH or electrically LOW depending upon whether a fifth monitored condition is sensed by said fifth of said associated condition sensing means as being in either a ninth or tenth state, wherein when said output signal is produced in response to said first state being sensed said output signal continues to be produced regardless of the respective states sensed by all of said associated condition sensing means, wherein when said first state ceases to be sensed and instead said second state is sensed said output signal continues to be produced if said third and fifth state are sensed and at the same time said eighth and tenth states are sensed.

6. A multi-input electrical monitor according to claim 5 wherein said first input signal is electrically HIGH when said first monitored condition is sensed as being in said first state, wherein said second input signal is electrically HIGH when said second monitored condition is sensed as being in said third state, wherein said third input signal is electrically HIGH when said third monitored condition is sensed as being in said fifth state, wherein said fourth input signal is electrically HIGH when said fourth monitored condition is sensed as being in said seventh state, and wherein said fifth input signal is electrically HIGH when said fifth monitored condition is sensed as being in said ninth state.

7. A multi-input electrical monitor according to claim 1 wherein said other of said plurality of input terminal means comprises at least first second third and fourth input terminals, wherein said second input signal is applied to said first input terminal, wherein said second input terminal receives a third input signal from a third of said associated condition sensing means, wherein said third input signal is either electrically HIGH or electrically LOW depending upon whether a third monitored condition is sensed by said third of said associated condition sensing means as being in either a fifth or sixth state, wherein said third input terminal receives a fourth input signal from a fourth of said associated condition sensing means, wherein said fourth input signal is either electrically HIGH or electrically LOW depending upon whether a fourth monitored condition is sensed by said fourth of said associated condition sensing means as being in either a seventh or eighth state, wherein said fourth input terminal receives a fifth input signal from a fifth of said associated condition sensing means, wherein said fifth input signal is either electrically HIGH or electrically LOW depending upon whether a fifth monitored condition is sensed by said fifth of said associated condition sensing means as being in either a ninth or tenth state, wherein when said output signal is produced in response to said first state being sensed said output signal continues to be produced regardless of the respective states sensed by all of said associated condition sensing means, wherein when said first state ceases to be sensed and instead said second state is sensed said output signal continues to be produced if said third and fifth states are sensed and at the same time said eighth and ninth states are sensed.

8. A multi-input electrical monitor according to claim 7 wherein said first input signal is electrically HIGH when said first monitored condition is sensed as being in said first state, wherein said second input signal is electrically HIGH when said second monitored condition is sensed as being in said third state, wherein said third input signal is electrically HIGH when said third monitored condition is sensed as being in said fifth state, wherein said fourth input signal is electrically HIGH when said fourth monitored condition is sensed as being in said seventh state, and wherein said fifth input signal is electrically HIGH when said fifth monitored condition is sensed as being in said ninth state.

9. A multi-input electrical monitor according to claim 1 wherein said other of said plurality of input terminal means comprises at least first second third and fourth input terminals, wherein said second input signal is applied to said first input terminal, wherein said second input terminal receives a third input signal from a third of said associated condition sensing means, wherein said third input signal is either electrically HIGH or electrically LOW depending upon whether a third monitored condition is sensed by said third of said associated condition sensing means as being in either a fifth or sixth state, wherein said third input terminal receives a fourth input signal from a fourth of said associated condition sensing means, wherein said fourth input signal is either electrically HIGH or electrically LOW depending upon whether a fourth monitored condition is sensed by said fourth of said associated condition sensing means as being in either a seventh or eighth state, wherein said fourth input terminal receives a fifth input signal from a fifth of said associated condition sensing means, wherein said fifth input signal is either electrically HIGH or electrically LOW depending upon whether a fifth monitored condition is sensed by said fifth of said associated condition sensing means as being in either a ninth or tenth state, wherein when said output signal is produced in response to said first state being sensed said output signal continues to be produced regardless of the respective states sensed by all of said associated condition sensing means, wherein when said first state ceases to be sensed and instead said second state is sensed said output signal continues to be produced if said third and fifth states are sensed and at the same time said seventh and tenth states are sensed.

10. A multi-input electrical monitor according to claim 9 wherein said first input signal is electrically HIGH when said first monitored condition is sensed as being in said first state, wherein said second input signal is electrically HIGH when said second monitored condition is sensed as being in said third state, wherein said third input signal is electrically HIGH when said third monitored condition is sensed as being in said fifth state, wherein said fourth input signal is electrically HIGH when said fourth monitored condition is sensed as being in said seventh state, and wherein said fifth input signal is electrically HIGH when said fifth monitored condition is sensed as being in said ninth state.

11. A multi-input electrical monitor according to claim 1 wherein said first input signal is electrically HIGH when said first monitored condition is sensed as being in said first state, wherein said other of said plurality of input terminal means comprises at least first second third and fourth input terminals, wherein said second input signal is applied to said first input terminal, wherein said second input signal is electrically HIGH when said second monitored condition is sensed as being in said third state, wherein said second input terminal receives a third input signal from a third of said associated condition sensing means, wherein said third input signal is either electrically HIGH or electrically LOW depending upon whether a third monitored condition is sensed by said third of said associated condition sensing means as being in either a fifth or sixth state, wherein said third input signal is electrically HIGH when said third monitored condition is sensed as being in said fifth state, wherein said third input terminal receives a fourth input signal from a fourth of said associated condition sensing means, wherein said fourth input signal is either electrically HIGH or electrically LOW depending upon whether a fourth monitored condition is sensed by said fourth of said associated condition sensing means as being in either a seventh or eighth state, wherein said fourth input signal is electrically HIGH when said fourth monitored condition is sensed as being in said seventh state, wherein said fourth input terminal receives a fifth input signal from a fifth of said associated condition sensing means, wherein said fifth input signal is either electrically HIGH or electrically LOW depending upon whether a fifth monitored condition is sensed by said fifth of said associated condition sensing means as being in either a ninth or tenth state, wherein said fifth input signal is electrically HIGH when said fifth monitored condition is sensed as being in said ninth state, and wherein when said output signal is produced in response to said first state being sensed said output signal continues to be produced regardless of the respective states sensed by all of said associated condition sensing means.

12. A multi-input electrical monitor according to claim 1 wherein said output signal generating means comprises sensory signal generating means.

13. A multi-input electrical monitor according to claim 12 wherein said sensory signal generating means comprises auditory signal generating means.

14. A multi-input electrical monitor according to claim 12 wherein said sensory signal generating means comprises visual signal generating means.

15. A multi-input electrical monitor according to claim 12 wherein said sensory signal generating means comprises both auditory and visual signal generating means.

16. A multi-input electrical monitor according to claim 1 and further comprising third and fourth terminal means, wherein said third terminal means is electrically in series with said second terminal means, and wherein said output signal generating means is remotely situated and electrically connected to said third and fourth terminal means as to thereby be electrically connected to said second terminal means and complete an electrical circuit between said third and fourth terminal means.

17. A multi-input electrical monitor according to claim 1 and further comprising voltage regulator means, said voltage regulator means being electrically in series with and between said second terminal means and said output signal generating means.

18. A multi-input electrical monitor according to claim 1 and further comprising voltage regulator means, said voltage regulator means being electrically in series with and between said second terminal means and said output signal generating means, and diode means, said diode means being in series circuit with and between said second terminal means and said voltage regulator means, said diode means being effective to prevent damage resulting from a reverse polarity connection of said second terminal means to said associated source of electrical potential.

19. A multi-input electrical monitor according to claim 1 and further comprising voltage regulator means, said voltage regulator means comprising Darlington transistor means having collector emitter and base terminals, wherein said collector and emitter terminals are electrically in series with and between said second terminal means and said output signal generating means, electrical resistance means electrically connected from said collector terminal to said base terminal, zener diode means electrically connected from said base terminal to a reference voltage potential, and capacitor means, said capacitor means having one electrical side connected to said emitter terminal and an other electrical side connected to said reference voltage potential.

20. A multi-input electrical monitor according to claim 1 wherein said electrical logic circuitry means comprises first and second electrical switch means each having "on" and "off" states, said first electrical switch means being electrically connected to said output signal generating means as to thereby place said output signal generating means electrically between said first electrical switch means and said second terminal means, wherein said second electrical switch means is electrically connected to said second terminal means, wherein said second electrical switch means is electrically connected to said first switch means so that when said second switch means is in its "on" state said first switch means is in its "off" state, wherein said certain of said plurality of input terminal means is electrically connected to said first switch means, wherein when said first input signal on said certain of said plurality of input terminal means is electrically HIGH said first switch means is caused to be in its "on" state regardless of whether said second switch means is in either its "on" or its "off" state thereby causing energization of said output signal generating means, wherein when said first input signal on said certain of said plurality of input terminal means is electrically LOW said first switch means is caused to be in its "off" state, wherein said other of said plurality of input terminal means is electrically connected to said second switch means, wherein when said second input signal on said other of said plurality of input terminal means is electrically LOW said second switch means is in its "off" state and said first switch means is in its "on" state, and wherein when said second input signal on said other of said plurality of input terminal means is electrically HIGH said second switch means is caused to be in its "off" state.

21. A multi-input electrical monitor according to claim 20 wherein said certain of said plurality of input terminal means comprises a plurality of certain input terminal means, wherein each of said plurality of certain input terminal means receives respective input signals from associated ones of said plurality of condition sensing means, wherein each of said plurality of certain input terminal means is electrically connected to said first switch means, and wherein said first switch means is caused to be in its "on" state whenever any of the respective input signals from said associated ones of said plurality of condition sensing means and applied to said plurality of certain input terminal means is electrically HIGH.

22. A multi-input electrical monitor according to claim 20 wherein said other of said plurality of input terminal means comprises a plurality of other input terminal means, wherein each of said plurality of other input terminal means is electrically connected to said second switch means, wherein each of said plurality of other input terminal means receives respective input signals from other ones of said plurality or condition sensing means, and wherein said second switch means is caused to be in its "on" state whenever any of the respective input signals from said other ones of said plurality of condition sensing means and applied to said plurality or other input terminal means is electrically LOW.

23. A multi-input electrical monitor according to claim 18 wherein said certain of said plurality of input terminal means comprises a plurality of certain input terminal means, wherein each of said plurality of certain input terminal means receives respective input signals from associated ones of said plurality of condition sensing means, wherein each of said plurality of certain input terminal means is electrically connected to said first switch means, wherein said first switch means is caused to be in its "on" state whenever any of the respective input signals from said associated ones of said plurality of condition sensing means and applied to said plurality of certain input terminal means is electrically HIGH, wherein said other of said plurality of input terminal means comprises a plurality of other input terminal means, wherein each of said plurality of other input terminal means is electrically connected to said second switch means, wherein each of said plurality of other input terminal means receives respective input signals from other ones of said plurality of condition sensing means, and wherein said second switch means is caused to be in its "on" state whenever any of the respective input signals from said other ones of said plurality of condition sensing means and applied to said plurality of other input terminal means is electrically LOW.

24. A multi-input electrical monitor according to claim 20 wherein both said first electrical switch means and said second electrical switch means comprise solid state switching devices.

25. A multi-input electrical monitor according to claim 20 wherein said first electrical switch means comprises first transistor means having an emitter collector and base, wherein said second electrical switch means comprises second transistor means having an emitter collector and base, wherein the collector and emitter of said first transistor means are in series circuit with said output signal generating means, wherein said second transistor means is electrically connected to said second terminal means through the collector and emitter of said second transistor means, wherein the collector emitter of said second transistor means is electrically connected to said base of said first transistor means, wherein said base of said first transistor means is electrically connected to said other of said plurality of input terminal means, and wherein said base of said second transistor means is electrically connected to at least some of said other of said plurality of other input terminal means.

26. A multi-input electrical monitor according to claim 25 wherein said certain of said plurality of input terminal means comprises a plurality of certain input terminal means, and wherein said base of said first transistor means is electrically connected to said plurality of certain input terminal means.

27. A multi-input electrical monitor according to claim 26 and further comprising diode means respectively in circuit between said base of said first transistor means and each of said plurality of certain input terminal means.

28. A multi-input electrical monitor according to claim 25 wherein said other of said plurality of input terminal means comprises a plurality of other input terminal means, and wherein said base of said second transistor means is electrically connected to said at least some of said other of said plurality of other input terminal means.

29. A multi-input electrical monitor according to claim 28 and further comprising diode means respectively in circuit between said base of said second transistor means and each of said at least some of said other of said plurality of other input terminal means.

* * * * *

UNITED STATES PATENT AND TRADEMARK OFFICE
CERTIFICATE OF CORRECTION

PATENT NO. : 5,043,700
DATED : August 27, 1991
INVENTOR(S) : Michael J. Rymut

It is certified that error appears in the above-identified patent and that said Letters Patent is hereby corrected as shown below:

Column 2, line 59, change "emeans" to --- means ---.

Column 3, line 29, between "grounded" and "142" insert --- as at 140, is electrically connected, as through switch means ---.

Column 4, line 2, between "said" and "generating" insert --- Motorola Semiconductor Products, Inc.; and the sensory signal ---.

Column 7, line 20, after "ductor" insert --- means 62 and alarm or sensory warning means 68. ---.

Column 7, line 59, after "(The" insert --- current cannot flow along conductor 24 to terminal means 14 ---.

Column 12, line 41, immediately after "and" insert --- 158: ---.

UNITED STATES PATENT AND TRADEMARK OFFICE
CERTIFICATE OF CORRECTION

PATENT NO. : 5,043,700

DATED : August 27, 1991

INVENTOR(S) : Michael J. Rymut

It is certified that error appears in the above-identified patent and that said Letters Patent is hereby corrected as shown below:

Column 13, lines 6 and 7, delete "has an output signal having a LOW logic level, or,"

Column 13, line 17, immediately after "transistor" insert --- 44 ---.

Column 14, line 49, change "8" to --- 18 ---.

Column 20, line 10, after "which" change "aare" to --- are ---.

Column 20, line 22, between "means" and "will" insert --- 44 ---.

Column 20, line 36, between "transducers" and "154a" insert --- 154, ---.

Column 20, line 41, change "154a56" to --- 154a, 156 --- .

UNITED STATES PATENT AND TRADEMARK OFFICE
CERTIFICATE OF CORRECTION

PATENT NO. : 5,043,700

DATED : August 27, 1991

INVENTOR(S) : Michael J. Rymut

It is certified that error appears in the above-identified patent and that said Letters Patent is hereby corrected as shown below:

Column 22, line 46, change "amp" to --- lamp ---.

Column 23, line 46 (Claim 3, line 14 thereof), immediately after "means" insert a comma (,).

Column 24, line 57 (Claim 5, line 32 thereof), change "state" to --- states ---.

Signed and Sealed this

Tenth Day of November, 1992

Attest:

DOUGLAS B. COMER

*Attesting Officer*   *Acting Commissioner of Patents and Trademarks*